United States Patent [19]

Sato et al.

[11] 3,962,491

[45] June 8, 1976

[54] PROCESS FOR PRODUCING RESIN-COATED SAND PARTICLES FOR USE IN SHELL MOLES

[75] Inventors: Tadashi Sato, Toyoda; Yasunobu Yamamoto, Kariya; Iwao Mizutani, Chiryu; Shigemitsu Yoshimi; Tsutomu Teramoto, both of Toyoda, all of Japan

[73] Assignee: Aisin Chemical Company, Limited, Kariya, Japan

[22] Filed: Feb. 8, 1974

[21] Appl. No.: 440,676

Related U.S. Application Data

[62] Division of Ser. No. 296,651, Oct. 11, 1972, abandoned.

[52] U.S. Cl. ............................ 427/195; 264/51; 264/53; 264/54; 427/221; 427/314
[51] Int. Cl.² .................. B05D 7/00; B05D 3/02
[58] Field of Search ............... 117/47 H, 54, 100 S, 117/161 L; 264/51, 53, 54; 427/221, 195, 314

[56] References Cited
UNITED STATES PATENTS

| | | | |
|---|---|---|---|
| 2,797,201 | 6/1957 | Veatch et al. | 264/51 |
| 2,806,832 | 9/1957 | Drumm et al. | 117/100 X |
| 2,888,418 | 5/1959 | Albanese et al. | 117/100 X |
| 2,913,787 | 11/1959 | Cooper | 117/100 X |
| 2,967,789 | 1/1961 | Hoyt | 117/100 S |
| 2,991,267 | 7/1961 | Bean | 117/100 X |

FOREIGN PATENTS OR APPLICATIONS

| | | | |
|---|---|---|---|
| 571,467 | 3/1959 | Canada | 117/100 |
| 835,792 | 5/1960 | United Kingdom | 117/100 |

*Primary Examiner*—Michael R. Lusignan
*Attorney, Agent, or Firm*—Ernest G. Montague; Karl F. Ross; Herbert Dubno

[57] ABSTRACT

A process for producing resin-coated sand particles for use in shell moles wherein a phenolformaldehyde resin in an initial stage of condensation is sprayed into a hot zone to form droplets which gravitationally descend to a cold zone and solidify. The particles are mixed with sand, heated to a temperature above the melting point of the resin and coat the sand.

3 Claims, 1 Drawing Figure

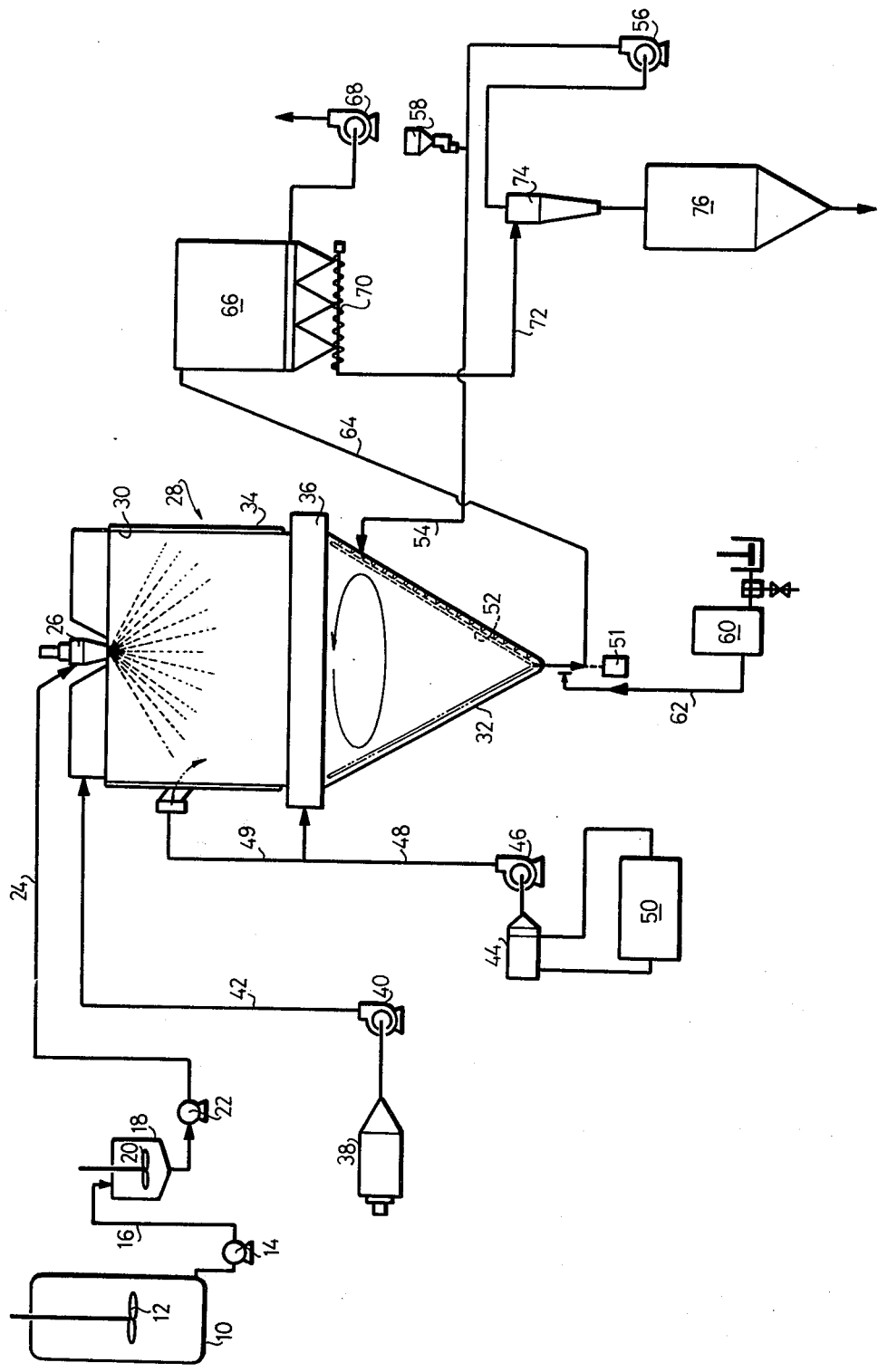

PROCESS FOR PRODUCING RESIN-COATED SAND PARTICLES FOR USE IN SHELL MOLES

This is a division, of application Ser. No. 296,651, filed Oct. 11, 1972, now abandoned.

This invention relates to a process for producing a granular solid resin composition containing an initial condensation product of phenol-formaldehyde resin. The invention also relates to a process for producing resin-coated sand particles for use in shell molds by using the above mentioned kind of resin composition.

In the specification, the term "phenolic resin" is used to describe both resol and novolak phenol-formaldehyde resins obtained by condensation of phenols and aldehydes in the presence of alkaline and acid catalysts, respectively. Phenolic resins are mainly classified as thermosetting resol resin and thermoplastic novolak resin. The former is widely used as an adhesive or as varnish for use in molds or in laminated articles, while the latter with a curing agent such as hexamethylenetetramine (HMT) added thereto is widely used as a thermosetting resin composition for molding or as a binder for sand particles for use in shell molds.

The resol resin is obtained by condensation of phenols and aldehydes in the presence of an alkaline catalyst. The resol resin thus obtained is a liquid which may be used when the resol resin can be applied in the liquid state such, for example, as paint or as an adhesive. It is difficult to use the resol resin for molding or as a binder for use in shell molds. Moreover, the resol resin is difficult to store and handle. In order to provide a solid resol resin, it has heretofore been proposed to promote the hardening reaction within a range in which the thermoplastic property can be maintained during concentration under a reduced pressure of the condensation reaction product, then cool so as to solidify it and finally crush it. But, this method has the disadvantages that it is difficult to control the hardening reaction so as to stop it at the desired stage, and that the reaction product can not easily be taken out of the reaction vessel owing to the high viscosity of the resin, thereby making the continuous production of the resol resin extremely difficult.

The novolak resin must be combined with a curing agent for use as a thermosetting resin. In the conventional process of producing the novolak resin the product obtained by the condensation of phenols and aldehydes in the presence of an acid catalyst is generally concentrated under a reduced pressure and then solidified by cooling to obtain solids having various shapes. The solids thus obtained are pulverized and subsequently the curing agent is added thereto. Thus the conventional process of producing the novolak resin has the disadvantages that it requires the step of addition of the curing agent, that the resin and curing agent are often mixed in such manner that the composition of the mixture is not uniform, and that the amount of the curing agent can exceed the theoretical amount and, as a result, when the mixture is heated much gas is evolved.

An object of the invention, therefore, is to provide a process for producing a phenolic resin composition in the form of substantially spherical solid particles which is capable of being melted and then cured upon heating.

Another object if the invention is to provide a process for continuously producing a granular solid phenolic resin which is substantially spherical.

A further object of the invention is to provide granular solid resin composition containing a phenolic resin whose curing reaction has proceeded only to a given stage.

A still further object of the invention is to provide a process of producing sand particles coated with the above mentioned resin composition and adapted for use in shell molds.

The process of producing a granular phenol-formaldehyde resin composition according to the invention comprises spraying a liquid containing phenol-formaldehyde resin in the initial stage of condensation reaction into an atmosphere heated to a temperature which is higher than the melting point of said initial condensation product so as to form liquid particles (droplets), and bringing the liquid particles into contact with a gas at a temperature which is lower than the melting point of the initial condensation product so as to solidify the particles.

According to another aspect of this invention, there is provided a process for producing resin-coated sand particles for use in shell molds which comprises the steps of spraying a liquid containing phenol-formaldehyde resin in the initial stage of its condensation reaction into an atmosphere heated to a temperature which is higher than the melting point of the initial condensation product so as to form liquid particles, bringing said liquid material into contact with a gas at a temperature which is lower than the melting point of the initial condensation product so as to solidify said particles and provide a granular solid phenol-formaldehyde resin composition, and mixing the resin composition with sand particles heated to a temperature higher than the melting point of the resin composition so as to coat the surface of each sand particle with the particles of the resin composition.

In accordance with the invention, therefore, the initial condensation product of phenol resin, in a molten state, is sprayed into a heated atmosphere so as to form liquid particles of the resin. Alternatively, the initial condensation product, in the form of solution in a suitable solvent, may be sprayed into the heated atmosphere. The temperature range of the atmosphere is selected such that the initial condensation product constituting liquid particles is maintained in the molten state. Thus, the resin in the liquid particles dispersed in this atmosphere descends therethrough by its own weight while remaining in the molten state. When the liquid particles comprising the initial condensation product and the solvent, descend within the heated atmosphere, the solvent is evolved and a certain degree of curing is promoted.

The liquid particles then descend by its own weight through the heated atmosphere into a cooling zone formed below the heated atmosphere. Into the cooling zone is supplied a gas, such as air, of a temperature lower than the melting point of the resin, so that the liquid particles are cooled and solidified in the cooling zone.

The initial condensation product of phenolic resin to be sprayed into the heated atmosphere may be prepared by reacting 1 mol of phenol or its derivatives with at least 1 mol of aldehyde in the presence of 1 – 30 percent by weight of acid or alkaline catalyst based on the phenol. The thermoplastic novolak resin is obtained by the use of acid catalyst, while the thermosetting resol resin is produced by the use of alkaline catalyst. In the process according to the invention, use may be made of either of these resins.

Alternatively, a mixture of the novolak resin and resol resin may be obtained. The mixing ratio of these two resins is not limited, but it is desirous to use at least 100 parts by weight of resol resin to 100 parts by weight of novolak resin.

In any case, the phenolic resin composition produced in accordance with the invention is adapted for use in molding materials, in adhesives or as a binder for shell molds in the manner similar to the phenolic resin compositions produced by the conventional method. Particularly, since the phenolic resin composition produced by the process according to the invention is substantially spherical solid particles, it can easily be handled and stored.

The invention also includes a process of producing resin coated sand particles for use in shell molds from the granular solid phenol resin composition obtained as above described. In accordance with the invention, the resol resin composition obtained by the above mentioned process is added to sand particles heated to a temperature higher than the melting point of the resol resin composition, and then the mixture is agitated and cooled so as to coat the surface of each sand particle with a thin resin layer. One of the most important advantages of this process resides in that the amount of gases generated at the time of mixing the resin composition with the sand particles and injurious to the public health is extremely small owing to the fact that the resin composition does not contain HMT which generates injurious gases containing ammonia and formaldehyde at the time of thermal decomposition thereof. Additionally, when the resin coated sand particles are baked in order to obtain shell molds, the amount of the above mentioned injurious gases to be generated is also small. Experiments have shown that the amount of gases, particularly ammonia and formaldehyde generated at the time of forming the shell molds from the resin coated sand particles obtained by the process according to the invention, is 1/10 or less compared with that which is generated at the time of forming the shell molds from the sand particles coated with novolak phenol resin containing HMT.

As the phenol component of the condensation product, phenol or its derivatives may be used alone or in any combination thereof. Examples of the suitable derivatives are the meta-alkyl phenols having alkyl groups with 1 to 6 carbon atoms, such as m-cresol, m-ethylphenol, m-propylphenol, m-isopropylphenol, m-butylphenol, m-sec-butylphenol, m-ter-butylphenol, and m-amylphenol; also suitable are meta substituted alkoxyphenols such as m-methoxyphenol, m-ethoxyphenol and m-propoxyphenol; metahalogenated phenols such as m-chlorophenol and m-bromophenol can be used; resorcinol is also effective. As the phenol component, use may preferably be made of technical methacresol containing the above-mentioned m-alkyl phenol and a small amount of the ortho- and para-isomers.

Suitable examples of aldehydes of the aldehyde component are formaldehyde in the form of formalin or paraformaldehyde and furfural.

The alkaline catalysts can include ammonia water, various kinds of amines, hydroxides of alkaline metals such as caustic soda, hydroxides of alkaline earth metals such as magnesium hydroxide and basic salts such as sodium carbonate.

The acid catalyst can include inorganic acids such as hydrochloric acid, sulphuric acid; or organic acids such as acetic acid.

The proportion and reacting condition of these compositions are the same as those of the conventional phenol resin and will be clear to those skilled in the art.

The resin material which is sprayed into the heated atmosphere may be a liquid reaction product produced by condensation of phenols and aldehydes or solid phenol resin separated from the liquid reaction product or a solution produced by resolving this phenol resin in a suitable solvent such as a lower alcohol, for example, methanol.

The phenolic resin may be modified by introducing an amino group into its molecular structure. Such phenolic resins modified by amino compounds can be obtained when the reaction of the phenols with the aldehydes is performed in the presence of an amino compound. Examples of the amino compounds include melamine, urea, guanamine and dicyandiamide.

The resin material may contain a foaming agent which does not act at the temperature at which the phenolic resin is sprayed into the heated atmosphere, but acts at a temperature at which occurs the final curing reaction. The material containing foaming agent produces a porous solid particulate composition due to the foaming action during the final curing reaction. The resin composition containing foaming agent may preferably be used for coating the sand particles for use in shell molds. The sand particles coated with the resin composition are capable of increasing the contact area between the resin and the sand particles by foaming and expansion of the resin when the sand particles are heated in a given mold, and as a result, a shell mold having an extremely high strength can be obtained. As the foaming agents, use may be made of organic foaming agents such as dinitro-sopent-amethylenetetramine, azodicarboxylic acid amide or hydrazine. Although, from the view point of compatibility or co-solubility with most ingredients of the composition, an organic forming agent is preferably used, inorganic foaming agents such as sodium hydrogen carbonate may also be used.

The process according to the invention is described with reference to the annexed drawing, in which:

The sole FIGURE is a flow diagram of an apparatus suitable for performing the process of the invention.

Refering to the drawing, reference numeral 10 denotes a tank which temporarily contains the above mentioned resin material. The tank 10 is preferably provided with an impeller 12 adapted to agitate the material in the tank 10. The material in the tank 10 is fed through a pump 14 and conduit 16 to a service tank 18. The service tank 18 is preferably provided with a heating means such as a hot water jacket which is adapted to heat the material agitated by an impeller 20 to a temperature at which the viscosity of the material reaches a value enabling the resin material to be sprayed. The preferable value of the viscosity is not more than 3000 centipoises. If the viscosity of the resin material is low enough to be sprayed, the heating step may be omitted. The material in the service tank 18 is fed under pressure by a quantitative pump 22 through a conduit 24 to an atomizer 26 from which the resin material is sprayed downwardly into a drying tank 28.

The drying tank 28 essentially comprises a cylinder portion 30 so arranged that the axis thereof is substantially vertical, and a cone portion 32 which communicates with the lower end of the portion 30. The cylinder portion 30 is preferably surrounded by a cooling jacket 34. At the boundary between the cylinder portion 30 and the cone portion 32 is arranged a cooling jacket 36 adapted to prevent the wall of the cone portion 32 from becoming heated. To the upper part of the cylinder part 30 is supplied by a fan 40 and conduit 42 hot air generated at a hot air furnace 38. A stream of cooled air generated at a refrigerator 50 is supplied through a heat exchanger 44, fan 46 and conduit 48 to the cooling jacket 36. Part of the cooled air is supplied from the conduit 48 to a branch conduit 49 from which the cooled air is ejected into the tank 28 along the inner wall of the cylinder portion 30 to form an air curtain which serves to prevent adhesion of the sprayed resin. Thus the drying tank 30 maintains a high temperature atmosphere at its upper part, whereas a low temperature atmosphere is sustained at its lower part and along its wall portion. The high temperature atmosphere causes the phenolic resin in the raw material sprayed from the atomizer 26 to undergo partial curing and is adjusted to a temperature at which the solvent or any other vaporizable ingredients contained in the resin material can rapidly be removed by vaporization, for example, as 100°C to 200°C, while the low-temperature atmosphere is adjusted to a temperature at which the heated particles can rapidly be cooled such as 5°C to 50°C.

Accordingly, the material sprayed from the atomizer 26 into the drying tank 28 is formed into spherical liquid particles in the high-temperature atmosphere and the solvent or any other vaporizable components which may be present are vaporized. If the material containing the resol resin is sprayed, its self-curing property causes it to promote its own partial curing. Then the liquid particles drop into the low-temperature atmosphere and are cooled to form solid granular resin composition. At the same time, the curing reaction ceases as the solid resin composition drops onto the inner wall surface of the cone portion 32.

The cone portion 32 is preferably provided at its inner peripheral surface with an air sweeper 52 having a number of holes and adapted to be rotated at a slow speed by means of a motor 51. Air ejected from the holes of the air sweeper 52 prevents the solid particles from sticking to the inner wall of the cone portion 32, thereby sweeping down the solid particles to the lower part of the cone portion 32. To the upper end of the cone portion 32 is connected one end of a conduit 54 through which is fed air from a fan 56. To the air flowing through the conduit 54 is preferably supplied a lubricant such as wax from a lubricant supplying device 58 at a given rate. The air bearing the wax is supplied into the cone portion 32 where it is brought in contact with the solid resin particles, so that each particle is coated with the lubricant and smoothly flows down along the inner wall surface of the cone portion 32 and is swept downwards by the action of the air sweeper 52 and subsequently discharged out of the drying tank 28 through the outlet formed at the lower end of the cone portion 32.

The resin composition discharged from the tank 28 is fed through a conduit 64, constituting a pneumatic conveyer, to a separating device 66 such as a bag filter or cyclone with the acid of compressed air fed through a conduit 62 from a tank 60. The air separated is exhausted by means of a fan 68, while the particles collected are supplied from the base of the bag filter 66 through a screw conveyor 70, conduit 72 to a cyclone 74. The particles collected at the cyclone 74 are stored in a reservoir 76, while the air separated is supplied to the fan 56 and used as the carrier for supplying the lubricant to the drying tank 28.

The invention will be more fully understood from the following specific Examples. All the Examples were carried out with the aid of the apparatus shown in the drawing. In the Examples, all parts and percents are by weight.

EXAMPLE 1

1 mol of phenol and 1.9 mol of formaldehyde were reacted for condensation in the presence of 0.15 mol of ammonia at 80°C to 100°C for 1 hour. To the product thus obtained was added 20 percent of cooling water for the total weight of the product and then the mixture was cooled to a temperature lower than 50°C to cease the condensation reaction. Then, the product was allowed to stand and the supernatant liquid was removed. To the residue was added 5 percent of methanol on the basis of the total weight to obtain a resin material. The material contained 73 percent of the solid component and the viscosity was 800 centipoises.

The material was sprayed from a centrifugal atomizer (the speed of the rotary disc being 1500 r.p.m.) into an atmosphere whose high temperature side was kept at 160°C and low temperature side at 35°C with the flow rate of 30 l/hr.

Substantially spherical solid particles were obtained with the rate of 20 Kg/hr. Each of these particles had a particle size of 70 microns to 100 microns and a melting point of 70°C to 75°C.

EXAMPLE 2

The resin material obtained in Example 1 was sprayed from the nozzle type atomizer provided with a nozzle whose diameter was 0.9 mm under the conditions that the spraying pressure was 8 Kg/cm$^2$ and flow rate was 80 l/hr. The temperature of the atmosphere was 190°C at the higher temperature side and 40°C at the lower temperature side.

There were obtained resin composition particles each having a diameter of 200 microns to 300 microns and a melting point of 65°C to 70°C at the rate of 55 Kg/hr.

EXAMPLE 3

2 mols of formaldehyde and 0.07 mol of sodium hydroxide based on 1 mol of phenol were used under the same conditions as in Example 1. A material having a solid content of 55 percent and viscosity of 400 centipoises was obtained.

The material was sprayed from the centrifugal type atomizer (revolution rate of the rotary disc was being 20,000 r.p.m.) into the atmosphere whose higher temperature side was 185°C and lower temperature side was 40°C at the rate of 40 l/hr. The resin composition particles each having a particle size of 70 microns to 100 microns and melting point of 70°C to 75°C were obtained at the rate of 20Kg/hr.

EXAMPLE 4

In the same manner as in Example 1, an amount of stearic acid bisamide was continuously fed from the conduit 58 into the cone portion 32. The amount of stearic acid bisamide fed into the cone portion was about 3 percent based on the weight of the resin formed per unit time.

Particles covered with stearic acid bisamide were obtained and were spherical in shape, each having a diameter of 80 microns to 110 microns and an improved stability against blocking during storage.

EXAMPLE 5

1 mol of phenol was reacted for condensation with 0.85 mol of formaldehyde in the presence of 1 percent of oxalic acid with based on the weight of phenol at 100°C for 3 hours. To the product thus obtained was added 20 percent of cooling water based on the total weight of the product obtained to cease the condensation reaction. Then, the cooled product was allowed to stand and then the supernatant liquid was removed by decantation to obtain a novolak resin initial condensation product. To this initial condensation product was added the resol resin initial condensation product in the ratio of 1 : 1 by weight to obtain the resin material having a solid content of 70 percent and a viscosity of 950 centipoises at 25°C.

The resin material was sprayed from the centrifugal atomizer (the rate of speed being 20,000 r.p.m.) into the atmosphere whose higher temperature side was kept at 200°C and lower temperature side at 40°C at the rate of 35 1/hr.

The resin composition particles each having a spherical shape were obtained at the rate of 23 Kg/hr. The resin composition particles thus obtained had a particle size of 70 micjons to 100 microns and a melting point 65°C to 75°C.

EXAMPLE 6

The novolak resin initial condensation product obtained in Example 5 and the resol resin initial condensation product obtained in Example 1 were mixed in the weight ratio of 1 : 4 to obtain a resin material. This resin material had a solid component of 72 percent and viscosity of 870 centipoises.

The material was treated in the same conditions as those in Example 5 to obtain resin composition particles each having a particle size of 70 to 100 microns and melting point of 68°C to 73°C, the yield being 25 Kg/hr.

The resin compositions obtained in Examples 1 to 6 were used to obtain resin coated sand particles by the hot mulling method.

TABLE 1

|  | Examples ||||||  Comparison Examples ||
|---|---|---|---|---|---|---|---|---|
|  | 1 | 2 | 3 | 4 | 5 | 6 | 1 | 2 |
| Bending strength, 1) $Kg/cm^2$ | | | | | | | | |
| 250°C, 50 sec. | 53.0 | 51.4 | 70.5 | 69.9 | 65.5 | 48.3 | 67.0 | 75.1 |
| 250°C, 90 sec. | 51.4 | 52.6 | 72.1 | 66.0 | 72.5 | 49.0 | 66.4 | 76.5 |
| Melting point, °C 2) | 100 | 95 | 99 | 105 | 98 | 102 | 97 | 93 |
| Peel back property | | | | | | | | |
| Weight(g/g) 3) | 0/188 | 0/191 | 3/170 | 0/185 | 5/180 | 0/135 | 5/185 | 65/110 |
| Aria (%) | 0 | 0 | 9 | 0 | 5 | 0 | 10 | 100 |
| Starting time sec. | — | — | 23 | — | 24 | — | 27 | 2 |
| Blocking property 4) | | | | | | | | |
| immediately after blending | G | G | S.L | G | G | G | G | S.L |
| after 24 hours | G | G | S.L | G | G | G | G | N.G |
| after 7 days | G | G | S.L | G | G | G | G | N.G |
| after 30 days | G | G | N.G | G | G | G | S.P | N.G |
| Amount of gas generated at forming of shell mold | | | | | | | | |
| $CH_2O$, mg 5) | 0.1 | 0.1 | 10.2 | 0.1 | 0.1 | 0.1 | 43.3 | 26.5 |
| $NH_3$, mg 6) | 5.8 | 6.2 | — | 5.8 | 2.6 | 5.4 | 41.0 | — |
| Total, mg | 5.9 | 6.3 | 10.2 | 5.9 | 2.7 | 5.5 | 84.3 | 26.5 |
| Composition of gas generated at casting bath temperature 7) | | | | | | | | |
| $H_2$, % | 47.9 | 47.3 | 49.1 | 47.8 | 48.2 | 48.9 | 45.6 | 45.1 |
| $N_2$, % | 1.5 | 1.9 | — | 1.5 | 0.7 | 1.3 | 8.3 | — |
| $O_2$, % | 1.6 | 1.9 | 1.7 | 1.6 | 1.4 | 1.6 | 1.2 | 2.8 |
| $CH_4$, % | 21.9 | 22.5 | 23.1 | 22.0 | 22.2 | 22.2 | 19.5 | 23.0 |
| CO, % | 27.1 | 26.4 | 25.9 | 27.6 | 26.9 | 26.0 | 25.3 | 29.1 |

G. — Good, S.L. — Slightly large, S.P. — Slightly present,
N.G. — No good
(Note)
1) measured by pouring method defined by the Japanese Industrial Standard (JIS).
2) On the basis of JIS.
3) Measured at 250°C on the basis of JIS.
4) Determined by feeling when grasped. Stored at room temperature under open condition.
5) 100g of the sample was sintered at 200°C for 10 minutes. All of the gas evolved was introduced into and absorbed by an absorbing liquid for use in sodium sulfite method. The quantity was determined by titration.
6) 100g of the sample was baked at 200°C for 10 minutes. The gas evolved was absorbed by dilute acid. The quantity was determined by alkaline reverse titration.
7) The sample is heated at 1400°C. The gas collected is measured by gas chromatography. CO2 or any other minute constituents were neglected and calculation was effected with the remainder taken as 100%.

EXAMPLE 7

1 mol of phenol, 0.85 mol of formaldehyde and 1 percent oxalic acid based on phenol were charged in a reaction vessel and heated at about 100°C for 3 hours. To the reaction mixture was added 20 percent of cooling water to cease the reaction and the mixture was allowed to stand. Then, the supernatant liquid was removed to obtain liquid novolak resin initial condensation product. To this product was added 5 percent of HMT, based on the weight of the product, and the mixture was used contained in the tank to use as the resin material. This mixture had a viscosity of about 1200 centipoises at 25°C.

This resin material was continuously supplied to the centrifugal atomizer (the rate of speed of the rotary disc being 15000 r.p.m.) at the flow rate of 30 1/hr and was sprayed into the atmosphere in the drying tank whose high-temperature side was kept at 150°C to 160°C and low-temperature side at 40°C to 50°C.

By this operation solid particulate resin composition was obtained at the rate of 20 Kg/hr. These particles each had a true spherical shape whose diameter ranged between 70 microns and 150 microns and melting point of 70°C to 80°C.

Example 8

282 parts of phenol, 216 parts of hexamethylolmelamine and 460 parts of 37 percent formalin were mixed in a reaction vessel. To the mixture was added ammonia water as a catalyst whose amount was about 10 percent based on the weight of phenol. The mixture was heated at 60°C to 100°C for about 2 hours. The supernatant liquid was removed by decantation from the reaction product, while the resin composition was washed one time with hot water. To this resin composition was added 50 parts of methanol and mixed homogeneously. The mixture was dried under the same conditions as in Example 1 to obtain solid resin composition particles having a particle size of 50 microns to 120 microns and a melting point of 75°C to 85°C. The resin composition was cured by heating at 150°C for 60 seconds.

To 100 parts of this resin composition were added 50 parts of α-cellulose fiber, 4 parts by weight of aqueous solution of 10 percent caustic soda and 2 parts by weight of zinc stearate. The mixture thus obtained was blended with hot rolls whose surface temperature was about 100°C and formed into a sheet having a thickness of about 2 mm. The time necessary for roll blending was about one half of that in the case of the conventional novolak resin. The time required for molding without blistering at 170°C was reduced to two thirds as compared with that for molding the product constituted by the conventional novolak resin. The product molded at 170°C under the pressure of 200 Kg/cm$^2$ for 2 minutes was pulverized and the amount of ammonia evolved at this time was measured by 150-R120 testing method to give a value of 0.08 percent. The amount of ammonia produced from the product molded from the conventional novolak resin with the curing agent was 0.32 percent.

EXAMPLE 9

A solid granular resin composition was obtained under the operating conditions same as in Example 8 except that there was used 1.0 percent of caustic soda as an alkaline catalyst instead of 10 percent of ammonia water.

To 100 parts of the resin composition was added 70 parts of wooden powders, 20 parts by weight of talc, 1 part of magnesium oxide and 2 parts of zinc stearate. The mixture thus obtained was treated in the same way as in Example 8 to obtain a sheet having a thickness of about 2mm. The sheet was tested as in Example 8 and showed the following results.

Roll blending time : 10 minutes
Blister free time : 60 seconds
Amount of ammonia produced : 0.09 percent
Tensile strength : 480 Kg/cm$^2$ (tested by Universal testing machine)

EXAMPLE 10

150g of the resin composition obtained in Example 8 was mixed with 5Kg of silica sand for use in shell molds and heated at 150°C in a laboratory type speed mixer for 2 minutes. The mixture thus obtained and 5 g of calcium stearate added thereto were mixed for 30 seconds and the mixture was cooled to obtain resin coated sand particles.

The resin coated sand particles were charged in a metal mold and heated at 250°C for 60 seconds to provide a test piece of 10mm × 10mm × 60mm. The bending strength of the test pieces ranged from 70 Kg/cm$^2$ to 75 Kg/cm$^2$.

EXAMPLE 11

There was prepared a resin composition in the same way as in Example 9 which was treated in the same manner as in Example 10 to provide test pieces whose bending strength were 65 Kg/cm$^2$ to 70 Kg/cm$^2$.

EXAMPLE 12

76 parts by weight of urea, 200 parts of 37 percent formalin and 100 parts of paraformaldehyde were mixed in a reaction vessel. The mixture thus obtained and 2.5 parts of barium hydroxide added thereto as a catalyst were heated at 90°C for 1 hour in the vessel into which were added 250 parts of phenol and 4.2 parts of barium hydroxide and the charge in the vessel were heated at 85°C for 1 hour. Then, 202 parts of methanol and 31 parts of 50 percent paratoluenesulfonic acid were added into the reaction vessel and reacted at 80°C for 30 minutes.

The reaction product thus obtained was neutralized by adding 0.9 part of barium hydroxide thereto and then cooled. The reaction product thus obtained did not show any tendency to separate into distinct portions and was a water soluble transparent liquid whose viscosity at 25°C was 30 centipoises and solids content was 55 percent. This reaction product liquid was dried under the same conditions as in Example 1 to obtain solid resin composition particles.

These resin composition particles were used in the same manner as in Example 10 to provide a test piece whose break down strength was 50 Kg/cm$^2$ to 55 Kg/cm$^2$.

EXAMPLE 13

The resol resin obtained by the condensation reaction of phenol and formaldehyde under the same conditions as in Example 1 was mixed with that amount of dinitrosopentamethylenetetramine(DPT) which corresponds to 3 percent of the resol resin. The mixture thus obtained was subjected to spraying and drying treatments which were the same as those described in the Example 1 to obtain a granular resin composition. 3 parts of the particulate resin composition was added to 100 parts by weight of sand previously heated to about 150°C in a speed mixer. The mixture was blended for 30 seconds. Then, to the mixture was added 1.5 parts of water and blended for 45 seconds and then 0.1 part by weight of calcium stearate to obtain resin coated sand particles by blending for 30 seconds.

EXAMPLE 14

3 parts of spherical resol resin particles containing 10 percent by weight of DPT was added to 100 parts of silica sand preveously heated to about 150°C contained in a speed mixer and the charge was blended for 90 seconds. The mixture thus obtained was added with 0.1 part by weight of calcium stearate and then further blended for 30 seconds to obtain coated sand particles.

EXAMPLE 15

Use was made of 10 percent of diazocarboxylic acid amide instead of 10 percent of DPT. Resin coated sand particles were prepared under the same conditions as in Example 13.

The resin coated sand particle obtained by the above mentioned Examples 13 through 15 were used under the similar conditions to each other to prepare shell molds test pieces. The break down strength of each test piece was measured by the pouring method defined by JIS. The results thus measured are shown in the following Table 2. For the sake of comparison, the results measured on the resin coated sand particles obtained by the Example 13 without adding the foaming agent and the results measured on the resin coated sand particle obtained by the Example 14 without adding the foaming agent are also shown as comparison Examples 3 and 4, respectively.

Table 2

| Sintering Condition | Example 13 | Example 14 | Example 15 |
|---|---|---|---|
| 250°C, 60 seconds | 63.0 | 69.7 | 61.2 |
| 250°C, 90 seconds | 63.8 | 68.4 | 61.8 |

| Sintering Condition | Comparison Example 3 | Comparison Example 4 |
|---|---|---|
| 250°C, 60 seconds | 57.1 | 55.9 |
| 250°C, 90 seconds | 54.0 | 56.7 |

As seen from the above Table 2, the resin coated sand particles added with the foaming agent according to the invention have significantly large break down strength when compared with the resin coated sand particles without containing the foaming agent.

What is claimed is:

1. A process of producing resin-coated sand particles for use in shell molds comprising the steps of:

a. forming a liquid containing phenol-formaldehyde resin in an initial state of the condensation thereof;
    b. spraying said liquid prior to complete condensation into a hot zone and maintaining in said hot zone an atmosphere at a temperature higher than the melting point of the initial-condensation product of the resin to form droplets of the liquid;
    c. causing the droplets sprayed into said hot zone gravitationally to descend into a cold zone below said hot zone;
    d. maintaining in said cold zone an atmosphere at a temperature lower than the melting point at said initial condensation product to solidify said droplets into generally spherical particles;
    e. collecting the generally spherical particles solidified in said cold zone; and
    f. mixing said resin particles with sand particles heated to a temperature higher than the melting point of said resin so as to coat the surface of each sand particle with said resin, said liquid being formed by condensing a phenol component selected from the group which consists of metal-alkyl phenols, metal-alkoxy phenols, meta-halogenated phenols, phenol and resorcinol with an aldehyde component selected from the group which consists of formaldehyde, formalin, peraformaldehyde and furfural in the presence of acidic or alkaline catalyst.

2. The process defined in claim 1 wherein said liquid is formed by reacting said components in the presence of an amino compound selected from the group which consists of melamine, urea, guanamine and dicyano diamide.

3. The process defined in claim 2 wherein said liquid is combined with a foaming agent selected from the group which consists of dinitrosopentamethylenetetramine, azodicarboxylix acid amide and hydrazine.

* * * * *